United States Patent Office 3,055,234
Patented Sept. 25, 1962

3,055,234
LOCKING DIFFERENTIAL
Loren James O'Brien, Grabill, Ind., assignor to Dana Corporation, Toledo, Ohio, a corporation of Virginia
Filed May 28, 1959, Ser. No. 816,524
21 Claims. (Cl. 74—711)

This invention relates to improvements in differentials in general and is particularly directed to improvements in limited slip differentials wherein a substantial driving torque is provided to both driving wheels of a motor vehicle even though one of the driving wheels has little or no traction.

A primary object of this invention is to provide an improved limited slip differential having an inherent power of action to bias the differential mechanism upon the application of a driving torque and includes, a driven case, opposed side gears in the driven case, compensating gearing between the opposed side gears, friction clutch means for coupling the side gears together, at least one of the side gears having faced coupling teeth for actuating the friction clutch means during relative rotation of the gears. The faced coupling teeth, being operatively associated with the side gears, load the friction clutch means during relative rotation thereof and biases the side gears together in proportion to the input torque. A structure of this type permits controlled differential action only. That is, when the driving torque is of a relatively low value the frictional resistance to differentiation is not sufficient to completely bias the side gears but will permit limited differential action between the side gears.

A further object of this invention is to provide a mechanism which is simple in construction, efficient in operation, inexpensive to assemble and manufacture and which will fit into present axle housings without modification thereof.

Further objects and advantages will become apparent upon reading the following specification together with the accompanying drawing which form a part hereof.

In the drawings—

Figure 1:
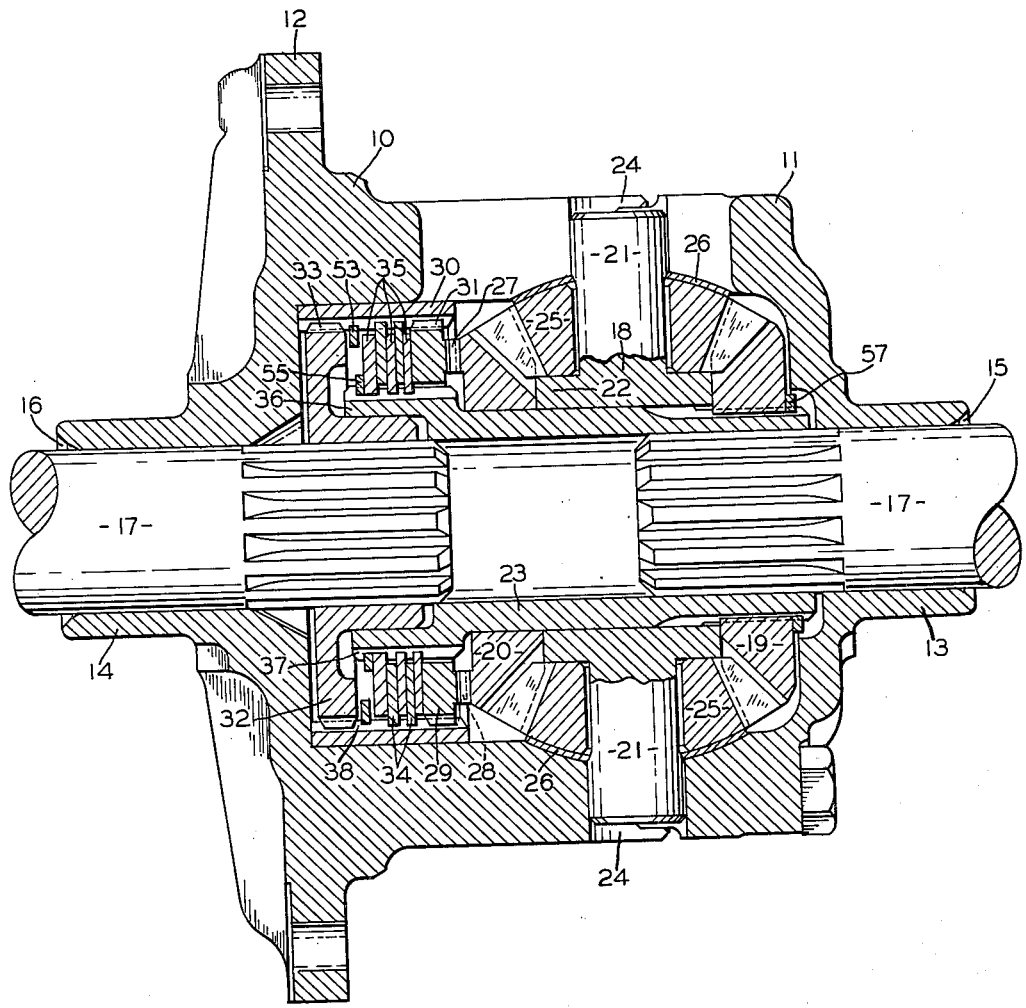
FIG. 1 is a sectional view taken in a plane containing the axis of rotation of a limited slip differential embodying the present invention.

The conventional differential, as used today in most motor vehicles, divides the driving torque equally between both drive wheels. In this connection, it should be remembered that the conventional differential is untrolled and will always drive the wheel which is the easiest to turn. This is a definite disadvantage while driving under adverse conditions as when the traction of one of the wheels is limited.

Many designs of locking differentials have been made in an effort to provide substantial driving torque to both wheels even when one of the wheels has no traction, and still permit efficient compensating action when one wheel rotates faster than the other, as when the vehicle makes a turn. These designs have included full locking, bias or power dividing, overruning and hydraulic types. Many methods of construction such as variable leverage, eccentric pinions, cam and sliding pins have been used to actuate friction clutch means normally provided between the side gears and the driven case. Such designs have resulted in complicated structures consisting of a pair of friction clutch means wherein the manufacturing tolerances are critical and the parts are subjected to excessive wear causing the differential to become inoperative. Variations of the manufacturing tolerances have tended to cause excessive "lock-up" because of the high transfer ratio involved. Further, manufacturing and assembly costs have been prohibitive.

The mechanism, as hereinafter described, includes only one friction clutch means to bias the side gears so that the torque transmitted to either vehicle wheel cannot fall below a predetermined minimum amount. This biasing means provides an internal frictional resistance to differentiation, independently of the case, thereby insuring an equal amount of transfer ratio to both vehicle wheels.

To accomplish the heretofore stated objects, the following factors must be considered:

(1) The means providing frictional resistance to the differential action must vary proportionately to the amount of driving torque transmitted to the vehicle wheels, providing, in effect, an automatic adjustment of the frictional resistance.

(2) It must provide a sufficient transfer of tractive torque to the non-spinning wheel at all times and under all operating conditions.

A limited slip differential according to this invention utilizes faced coupling teeth on the differential gearing for loading friction clutch means. The axial thrust produced by the faced coupling teeth coupled with the mechanical advantage of a multiple disc clutch provides the necessary amount of frictional resistance to differentiation between the side gears, variable proportionately to the input driving torque.

The differential mechanism includes a driven case or housing comprising a body 10 and a cap 11 secured together along a vertical median plane thereof, in any well known manner. The body 10 is provided with a flange 12 for receiving a ring gear, not shown. The ring gear is adapted to mesh with a suitable drive pinion for providing drive torque to the differential mechanism in a conventional manner. The cap 11 and the body 10 are provided with hubs 13 and 14 respectively on which the differential case is journaled on bearings, not shown, for rotation in a suitable axle housing. The hubs 13 and 14 are provided with central bores 15 and 16 respectively through which axle shafts 17 extend.

Referring to FIG. 1, a coupling member 18 is provided in a form of a spider for coupling the driving member or case to a pair of bevel side gears 19 and 20. The coupling member 18 is formed with spindles 21 extending radially relative to a hub 22 encircling a drive member 23. The spindles 21 extend diametrically through apertures 24 provided in the driven case, thereby securing the coupling member thereto for unitary rotation therewith.

A pair of bevel pinions or compensating gears 25 meshing with the side gears 19 and 20 are mounted on and rotatable in relation to the spindles 21. Thrust washers 26 are disposed between back faces of the pinions 25 and the driven case for absorbing thrust loads tending to be transmitted therebetween.

The differential gearing is conventional in design except for the bevel side gear 20 which is provided with faced coupling teeth. This side gear 20 is mounted on and rotatable in relation to the drive member 23 and is provided with positive pressure angle faced coupling teeth 27 on its back face. These teeth 27 mesh with coupling teeth 28 formed on the front face of a pressure plate member 29 for camming the pressure plate 29 axially outwardly in relation to the side gear 20. The pressure plate 29 is drivingly connected to a sleeve 30 as at 31 and is free to move axially in relation thereto. The aforedescribed structure constitutes the actuating means for loading the friction clutch means upon the application of a driving torque.

The other side gear 19 is drivingly connected to the drive member 23. This drive member 23 is splined to one of the axle shafts 17 thereby connecting the side gear 19 to the axle shaft.

Another drive member 32 is drivingly connected to the other axle shaft 17 and to the sleeve 30 as at 33. The sleeve 30 is fitted into the body 10 and is rotatable in relation thereto thereby connecting the side gear 20 to its respective axle shaft 17.

The friction clutch means herein described consists of interleaved discs interposed between the drive member 32 and the pressure plate 29. One set of discs 34 being interlocked with the sleeve 30 to rotate therewith and the other set of discs 35 being interlocked with the drive member 23 to rotate therewith.

As is shown in FIG. 1, the drive member 23 is provided with an external hub 36 formed with spur teeth 37 and the sleeve 30 is provided with internal annular spur gear teeth 38 opposed to and concentric with the spur gear teeth 37 of the drive member 23. Each disc 35 is formed with internal spur gear teeth interlocked with the spur gear teeth of the drive member 23 and each disc 34 is formed with external gear teeth interlocked with the internal annular gear teeth 38 of the sleeve 30.

In operation, the drive torque from the engine is transferred to the case in the conventional manner. As the case is rotated, drive torque is transmitted to the pinions 25 and the opposed side gears 19 and 20. This drive torque is then transmitted from the side gear 19 to the drive member 23 and from the side gear 20 to the drive member 32 through the intermeshing coupling teeth 27 and 28 of the side gear 20 and the pressure plate member 29 respectively. Since these coupling teeth are formed with positive pressure angles, the applied drive torque tends to cam these members in opposite directions regardless of the direction of input torque. This axial movement of the pressure plate 29 forces the friction discs 34 and 35 against a snap ring 55 provided on the hub 36 thereby frictionally locking the drive member 23 to the drive member 32 through the sleeve 30. The drive member 23 is provided with a second snap ring 57 which is secured thereto and disposed in abutting engagement with the outward face of the side gear 19. Accordingly, the axial forces generated by the coupling teeth 27 and 28 are contained within the drive member 23 by the engagement of the disks 34 or 35 with the snap ring 55 and the engagement of the side gear 19 with the snap ring 57. The sleeve 30 carries a snap ring 53 on the internal surface thereof positioned so as to engage the plate member 32 if it moves toward the drive member 23 thereby preventing the same from inadvertently imparting an engaging force to the disks 34 and 25.

Figure 2:
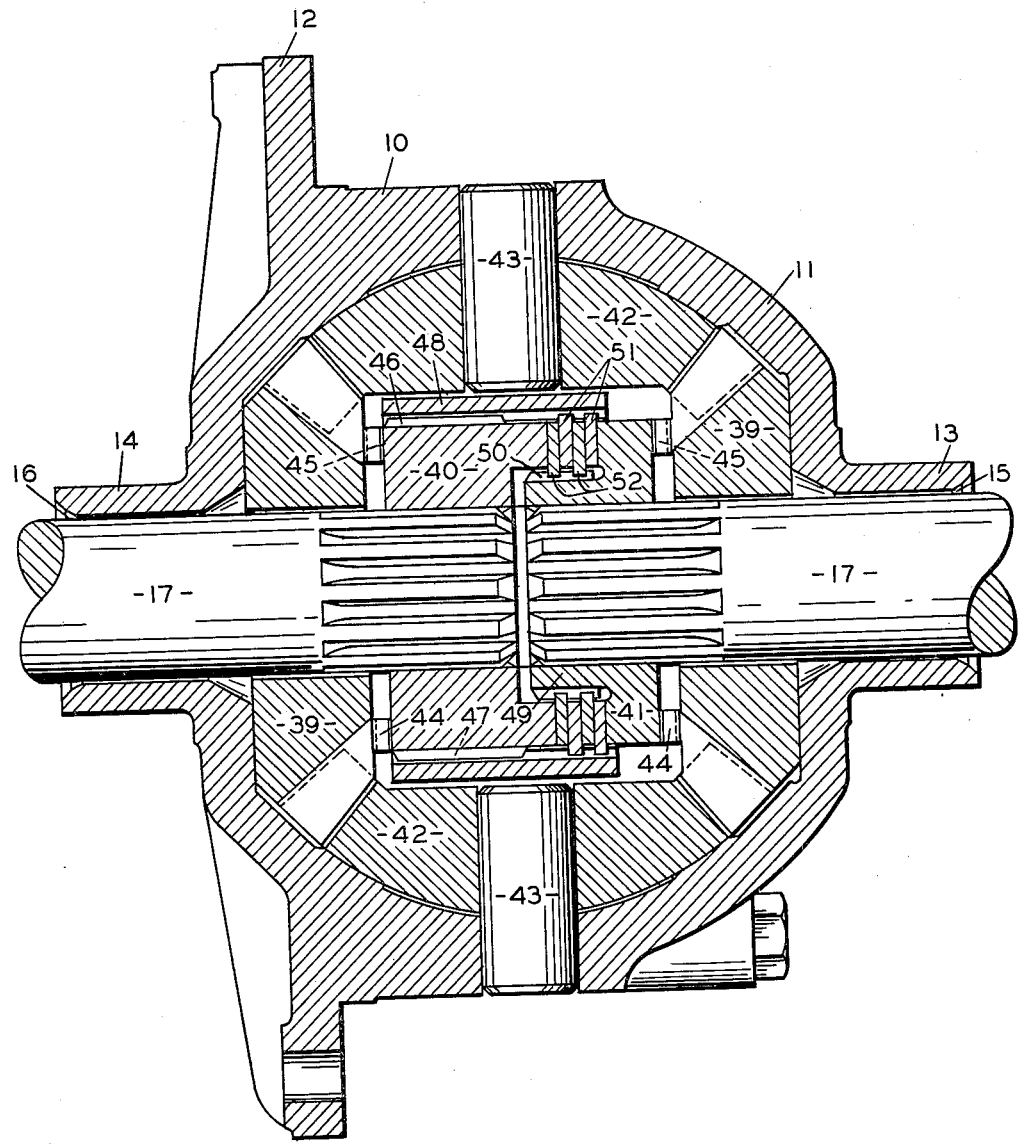
FIG. 2 is a sectional view similar to FIG. 1 of another form of a limited slip differential according to the present invention.

Referring now to FIG. 2, it will be seen that the differential gearing is conventional in design except for the bevel side gears which are composed of gear members 39 and drive members 40 and 41. A pair of bevel pinions or compensating gears 42 mesh with the gear members 39 and are further mounted on and rotatable in relation to pins 43 which are secured to the driven case.

The gear members 39 are mounted on and rotatable relative to the axle shafts 17. These gear members 39 are provided with positive pressure angle faced coupling teeth 44 on their front faces for meshing with faced coupling teeth 45 formed on the rear faces of the drive members 40 and 41 for camming the drive members axially inwardly regardless of the direction of input torque.

The drive member 40 is formed with external spur gear teeth 46 on its outer periphery for meshing with internal gear teeth 47 formed on an internal bore of a sleeve 48, the function of which will be described hereinafter. This drive member 40 is drivingly connected to one of the axle shafts 17. The other drive member 41 is drivingly connected to the other axle shaft 17. This drive member 41 is provided with a hub 49 having external spur gear teeth 50 opposed to and concentric with the spur gear teeth 47 of the sleeve 48.

The above described mechansim constitutes the actuating means loading the friction clutch means disposed between the drive members 40 and 41 frictionally locking the side gear 39 together. The friction clutch means herein described consist of interleaved discs interposed between the drive members 40 and 41. One set of discs 51 being interlocked with the sleeve 48 to rotate therewith and the other set of discs 52 being interlocked with the drive member 41 to rotate therewith.

As shown in FIG. 2, each disc 52 is formed with internal spur gear teeth interlocked with the spur gear teeth of the drive member 41 and each disc 51 is formed with external gear teeth interlocked with the internal annular gear teeth 47 of the sleeve 48.

In operation, the drive torque from the engine is transferred from the case in the conventional manner. As the case is rotated, drive torque is transmitted to the pinions 42 and to the opposed side gears 39. This drive torque is then transmitted to the drive members 40 and 41 through the intermeshing coupling teeth 44 and 45 of the side gears 39 and the drive members 40 and 41. Since these coupling teeth 44 and 45 are formed with positive pressure angles, the applied drive torque tends to cam the drive members 40 and 41 axially inwardly. This inward axial movement of the drive members 40 and 41 forces the friction discs 51 and 52 together thereby frictionally coupling the drive members 40 and 41 together, whereby the side gears 39 tend to function as a unit.

The description of the friction means is employed merely for the purpose of aiding in a better understanding of the embodiments of this invention, it being understood that other types of friction devices will work equally as well.

From the foregoing discussion of the embodiments shown, it is to be seen that applied driving torque is transferred from the driven case to the pinions, thence to the opposed side gears which in turn actuates the friction clutch means disposed therebetween. It is to be noted that the friction between the discs is not sufficient to lock the side gears together but is sufficient to permit motion to be transmitted inefficiently therebetween. The braking force created retards but does not prevent the compensating action of the side gears.

This frictional resistance to free differential action results in the application of a driving torque to both vehicle wheels even when one of the wheels is on a slippery surface and has little or no traction. When differential action is required, as when a vehicle is making a turn, the drive torque is usually reduced and hence there is little, if any, interference by the friction clutch means with the differential action of the mechanism.

It will be obvious that various changes in the details which have been herein described and illustrated in order to explain the nature of this invention, may be made by those skilled in the art within the principle and scope of the invention as expressed in the appended claims.

What is claimed is:

1. A differential transmission with frictional resistance to differentiation applied by, and in proportion to, the input torque comprising, a driven case, a pair of bevel side gears rotatable within said case, bevel pinions meshing with both side gears, coupling means carried by said case and supporting the pinions for rotation, a pair of drive members adapted to be driven by said side gears and at least one being provided with faced coupling teeth, a friction clutch interconnecting said drive members, said friction clutch being independent of said case so that clutching action is not transmitted through said case, faced coupling teeth on at least one of said side gears meshing with said faced coupling teeth on said one of the drive members for causing engagement of the friction clutch in response to input torque in either direction, the faced coupling teeth being of positive pressure angle thereby causing engagement of the friction clutch upon application of and in proportion to the input torque.

2. A differential transmission with a frictional resistance to differentiation applied by, and in proportion to, the input torque comprising, a pair of axially aligned axle shafts, a driven case rotatable on said axle shafts, a pair of side gears in said driven case, coupling means carried by the driven case, compensating gearing mounted on said coupling means and intermeshing with said side gears, a pair of drive members drivingly connected each to an axle shaft, a sleeve connected to one of said drive members, a plurality of discs driven by said sleeve, a plurality of discs interleaved with the former discs and driven by the other said drive member, and means including positive pressure angle faced coupling teeth operatively associated with at least one of said side gears for pressing said discs against each other in proportion to the input torque thereby frictionally clutching said side gears together by a force proportional to the input torque.

3. A differential transmission according to claim 2 in which the said drive members are provided with positive pressure angle faced coupling teeth for meshing with said coupling teeth operatively associated with the side gears for pressing said discs together in proportion to the input torque.

4. A differential transmission with a frictional resistance to differentiation applied by, and in proportion to, the input torque comprising, a pair of axially aligned axle shafts, a driven case rotatable on said axle shafts, a bevel side gear drivingly connected to each axle shaft within said case, one of said side gears having faced coupling teeth thereon, coupling means disposed in the driven case, compensating gearing mounted on said coupling means and intermeshing with the side gears, a friction clutch having cooperative friction surfaces interposed between said side gears, said friction clutch including an axial movable member having faced coupling teeth thereon for intermeshing with the said coupling teeth on the said side gear, whereby drive torque transmitted through the coupling teeth exerts axial thrust loads against the friction surfaces and frictionally retards the relative rotation between the side gears in proportion to the input torque.

5. A differential transmission with a frictional resistance to differentiation applied by, and in proportion to, the input torque comprising, coaxial axle shafts, a casing rotatable on said axle shafts, a side gear drivingly connected to each axle shaft within said casing, one of said side gears having cam means thereon, intermeshing compensating gearing disposed between said side gears and attached to the casing for rotation therewith, friction means disposed between said side gears and cooperative therewith and cooperative with the said cam means for frictional interlocking said side gears for unitary rotation in proportion to the input torque when input torque is applied to the driven casing, said friction means comprising an axial movable pressure plate member having cam means for cooperation with the cam means on the said side gear, a drive member secured on one of said axle shafts, a sleeve rotatable in the casing drivingly connecting the pressure plate member to said drive member, a second drive member secured to the other said axle shaft, a plurality of friction discs splined in alternate order to said sleeve and said drive member for transmitting torque therebetween, whereby input torque transmitted through the cam means causes axial thrust loads to be exerted by the pressure plate member in one direction, pressing said discs together, thereby frictionally clutching said drive members together in proportion to the input torque.

6. Friction clutch means for interlocking the side gears of a differential transmission, in combination, a pair of axle shafts, a driven case mounted on said axle shafts, and intermeshing gearing in said driven case, cam means provided on one of said gears, friction means comprising a rotatable sleeve member, a first drive member, a plurality of friction discs splined in alternate order to said members for transmitting torque therebetween, a second drive member arranged in a fixed position on one of said axle shafts and splined to said sleeve, a pressure plate splined to and movable axially on said sleeve on said pressure plate for cooperating with said cam means on said intermeshing gear, whereby input torque applied from the drive case to the intermeshing gears causes the cam means to move the pressure plate axially in one direction pressing the discs together in proportion to the input torsue, thereby frictionally locking the side gears together in proportion to the input torque.

7. Friction clutch means for coaxial side gears of a differential mechanism comprising in combination, a pair of axially aligned axle shafts, a driven case rotatable on said axle shafts, intermeshing gears in said driven case at least one being provided with faced coupling teeth thereon, means cooperative with at least said one intermeshing gear and with said axle shafts for frictionally locking said axles together for unitary rotation upon application of and in proportion to the input torque, said means comprising a friction clutch having faced coupling teeth thereon meshing with said faced coupling teeth carried by the intermeshing gears.

8. A differential transmission with a frictional resistance to differentiation applied by, and in proportion to, the input torque comprising, a pair of axially aligned axle shafts, a driven case rotatable on said axle shafts, a first drive member in said case fixedly secured on one of said axle shafts and having external gear teeth thereon, a second drive member provided with external gear teeth on its outer periphery and fixedly secured on the other said axle shaft, a pair of opposed side gears in the driven case, compensating gearing meshing with the opposed side gears, coupling means disposed in the driven case for coupling the said gears thereto, one of said side gears being fixedly secured on said first drive member, the other said side gear being mounted on and rotatable in relation to said first drive member, the last said side gear having coupling teeth on its back face, an axially movable pressure member in coaxial relation with last said side gear having coupling teeth on its front face mating with the coupling teeth on said gear, the coupling teeth being of positive pressure angle whereby drive torque transmitted through them causes relative axial displacement between the pressure member and the said axially aligned gear, said pressure member further having external gear teeth on its outer periphery, a sleeve fitted in the driven case and having internal gear teeth for meshing with the external gear teeth of the said second drive member and said pressure member, said internal gear teeth of the sleeve further being opposed to said external gear teeth on said first drive member, interleaved discs between the pressure member and the opposing face of the second drive member, one set of discs having internal gear teeth interlocked with the external gear teeth of the first drive member and the other set of discs having external gear teeth interlocked with the internal gear teeth of the sleeve, whereby axial thrust loads exerted against the discs by the said pressure member frictionally retards the relative rotation between the side gears in proportion to the input torque.

9. A differential transmission with a frictonal resistance to differentiation applied by, and in proportion to, the input torque comprising, a pair of axially aligned axle shafts, a driven case rotatable on said axle shafts, a drive member drivingly connected to each axle shaft within said case, a pair of bevel side gears each having faced coupling teeth, coupling means disposed in the driven case, compensating gearing mounted on said coupling means and intermeshing with said side gears, a friction clutch having cooperative friction surfaces interposed between said drive members, said drive members having faced coupling teeth for meshing with the faced coupling teeth on said side gears, the coupling teeth being of positive angle exert an axial thrust load against the friction surfaces and frictionally locks the side gears together in proportion to the input torque.

10. A differential transmission with a frictional resistance to differentiation applied by, and in proportion to, the input torque comprising, coaxial axle shafts, a casing rotatable on said axle shafts, a pair of bevel side gears within said case, the side gears having cam means on their front faces, intermeshing compensating gearing disposed between said side gears and attached to the case for rotation therewith, a pair of axially aligned drive members having cam means on their rear faces for co-operation with the cam means on the side gears, friction means disposed between said drive members and co-operative therewith for frictionally interlocking said drive members for unitary rotation in proportion to the input torque thereby frictionally interlocking said side gears, said friction means comprising a sleeve drivingly connected to one of said drive members, a plurality of friction discs splined in alternate order to said sleeve and the other said drive member for transmitting torque therebetween, whereby input torque transmitted through the cam means causes axial thrust loads to be exerted against said discs in proportion to the input torque.

11. Friction clutch means for interlocking the side gears of a differential transmission, in combination, a driven case, and intermeshing gears in said driven case, cam means provided on some of said gears, friction means comprising a rotatable sleeve, a first drive member for driving said sleeve, a second drive member, a plurality of friction discs splined in alternate order to said sleeve and said second drive member for transmitting torque therebetween, the drive members further being provided with cam means for engagement with the cam means on said gears and cooperating therewith in response to input torque in either direction, whereby input torque applied to the transmitting gears from the driven case in either direction causes the drive members to press the discs together in proportion to the input torque, thereby frictionally locking the side gears together in proportion to the input torque.

12. Friction clutch means for coaxial side gears of a differential mechanism in combination, a pair of axially aligned axle shafts, a driven case rotatable on said axle shafts, intermeshing gears in said driven case, means cooperative with said intermeshing gears and with said axle shafts for frictionally locking said axle shafts together for unitary rotation in proportion to the input torque, said means comprising a friction clutch having faced coupling teeth thereon meshing with faced coupling teeth carried by the intermeshing gears, whereby the faced coupling teeth actuate the friction clutch and tend to frictionally retard the rotation of one of the side gears when the rotation of the other side gear is retarded in proportion to the input torque.

13. A differential transmission with a frictional resistance to differentiation applied by, and in proportion to, the input torque comprising, a driven case, intermeshing gears in the driven case including a pair of opposed side gears, friction means disposed between said side gears and interconnecting the same, and means for causing engagement of said friction means comprising faced coupling teeth disposed between said friction means and said side gears, whereby input torque applied to said driven case causes operation of said friction means thereby locking said side gears together by a force proportional to the input torque.

14. A differential transmission for driving a pair of axles comprising means supplying an input torque, differential gearing receiving the input torque, a pair of members each drivingly connected to said differential gearing and also adapted for connection to an axle, clutch means for interconnecting said drive members, the driving connection between one of said drive members and said differential gearing including a member movable upon, and in proportion to, application of said input torque for actuating said clutch means.

15. A differential transmission for driving a pair of axles comprising casing means rotatably mounted on said axle for supplying an input torque, differential gearing adapted to receive the input torque, a pair of drive members each driven by said differential gearing and adapted for connection to an axle, mechanical friction clutch means for interconnecting said drive members, said clutch means being independent of said casing means so that clutching action is not transmitted through said casing means, the driving connection between at least one of said drive members and said differential gearing including means for actuating said clutch means upon, and in proportion to, applcation of said input torque.

16. A differential transmission for driving a pair of axles comprising means including a casing for supplying an input torque, differential gearing receiving the input torque, a pair of drive members each drivingly connected to said differential gearing and adapted for connection to an axle, a single mechanical friction clutch means adapted to interconnect said drive members, said clutch means being independent of said casing so that clutching action is not transmitted through said casing, the driving connection between at least one of said drive members and said differential gearing including means actuating said clutch means upon, and in proportion to, application of said input torque in either direction.

17. A differential transmission for driving a pair of axles comprising means supplying an input torque, differential gearing receiving the input torque, a pair of members each drivingly connected to said differential gearing and adapted for connection to an axle, clutch means for interconnecting said drive members and including a plurality of interleaved friction discs, said clutch means being independent of said supplying means so that clutching action is not transmitted through said supplying means, the driving connection between at least one of said drive members and said differential gearing including means compressing said interleaved discs upon, and in proportion to, application of said input torque in either direction.

18. A differential transmission for driving a pair of axles comprising means rotatably mounted on said axles for supplying an input torque, differential gearing receiving the input torque, a pair of drive members each drivingly connected to said differential gearing and also adapted for connection to an axle, clutch means including a plurality of interleaved discs adapted to interconnect said drive members, the driving connection between at least one of said drive members and said differential gearing including positive pressure angle coupling teeth for compressing said interleaved discs upon, and in proportion to, application of said input torque.

19. In a differential the combination comprising a rotatable casing having differential gearing disposed therein, a pair of axles extending into said casing and operatively connected to said differential gearing, mechanical friction clutch means independent of said casing for connecting said axles so that clutching action is not transmitted through said casing, and means operative in response and in proportion to input torque for actuating said clutch means.

20. In a differential the combination comprising a rotatable casing having differential gearing disposed therein, a pair of axles extending into said casing and operatively connected to said differential gearing, mechanical clutch means including cooperating friction surfaces independent of said casing connecting said axles so that clutching action is not transmitted through said casing, and cam means operative in response and in proportion to input torque for actuating said clutch means.

21. In a differential the combination comprising a rotatable casing having differential gearing disposed therein, a pair of axles extending into said casing and operatively connected to said differential gearing, mechanical clutch means including a pair of cooperating friction surfaces independent of said casing connecting said axles so that clutching action is not transmitted through said casing, and means including positive pressure angled face coupling teeth operative in response and in proportion to input torque actuating said clutch means.

References Cited in the file of this patent

UNITED STATES PATENTS

| | | |
|---|---|---|
| 1,104,005 | Romeiser | July 21, 1914 |
| 2,624,216 | Nielson | Jan. 6, 1953 |
| 2,687,657 | Kugel | Aug. 31, 1954 |
| 2,743,792 | Ransom | May 1, 1956 |
| 2,855,805 | Fallon | Oct. 14, 1958 |

FOREIGN PATENTS

| | | |
|---|---|---|
| 708,714 | Great Britain | May 12, 1954 |

UNITED STATES PATENT OFFICE
CERTIFICATE OF CORRECTION

Patent No. 3,055,234            September 25, 1962

Loren James O'Brien

It is hereby certified that error appears in the above numbered patent requiring correction and that the said Letters Patent should read as corrected below.

Column 6, line 8, after "sleeve" insert -- to press said discs against said second drive member, cam means --.

Signed and sealed this 5th day of February 1963.

(SEAL)
Attest:

ERNEST W. SWIDER            DAVID L. LADD
Attesting Officer            Commissioner of Patents